April 25, 1967 T. C. PAYNE 3,315,590
MEAT PROCESSING EQUIPMENT
Filed Aug. 6, 1965 4 Sheets-Sheet 1
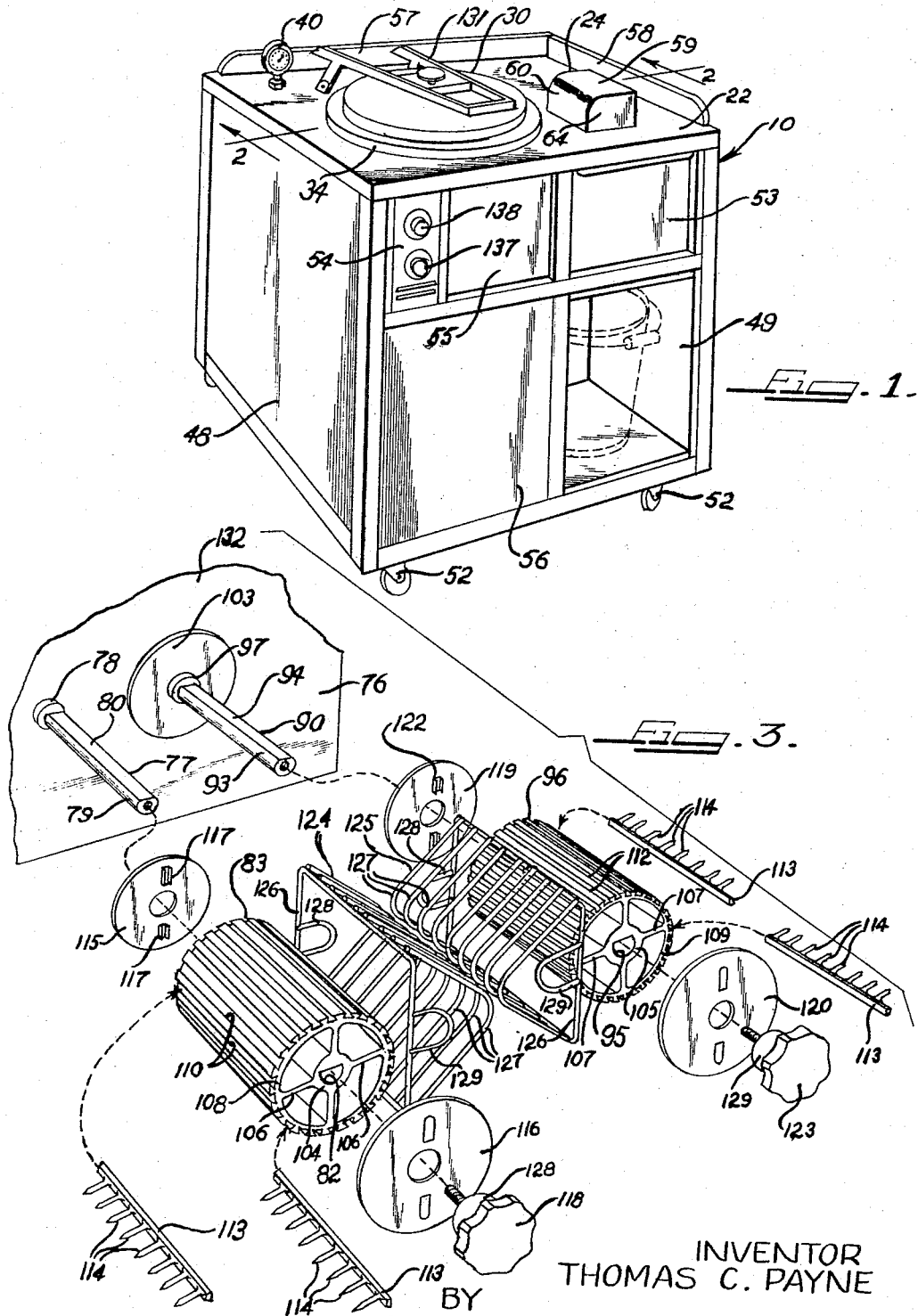
INVENTOR
THOMAS C. PAYNE
BY Horton, Davis, Brewer & Brugman
Attys.

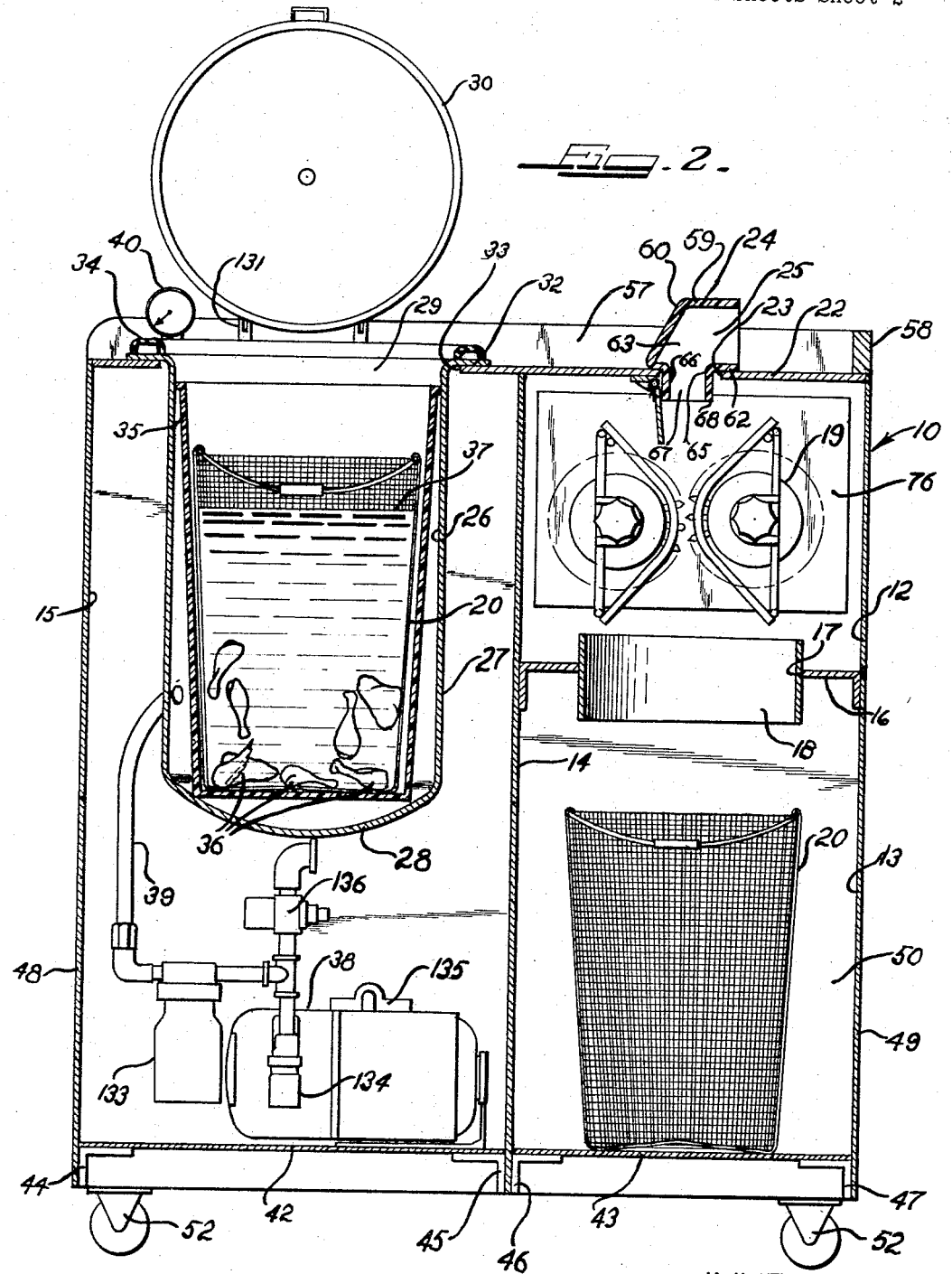

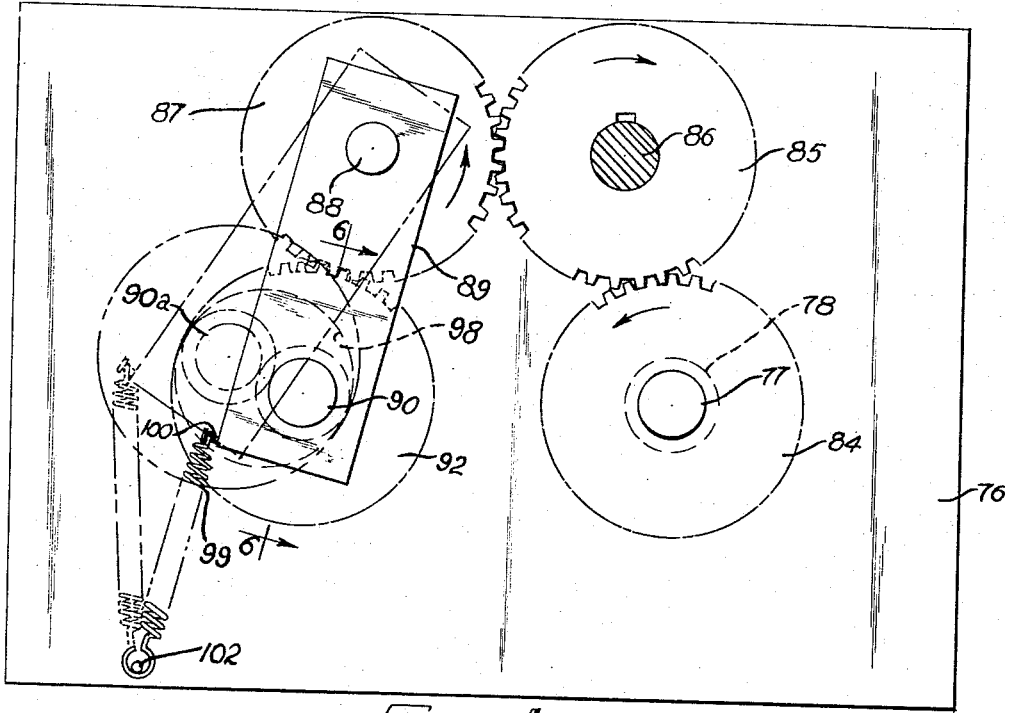
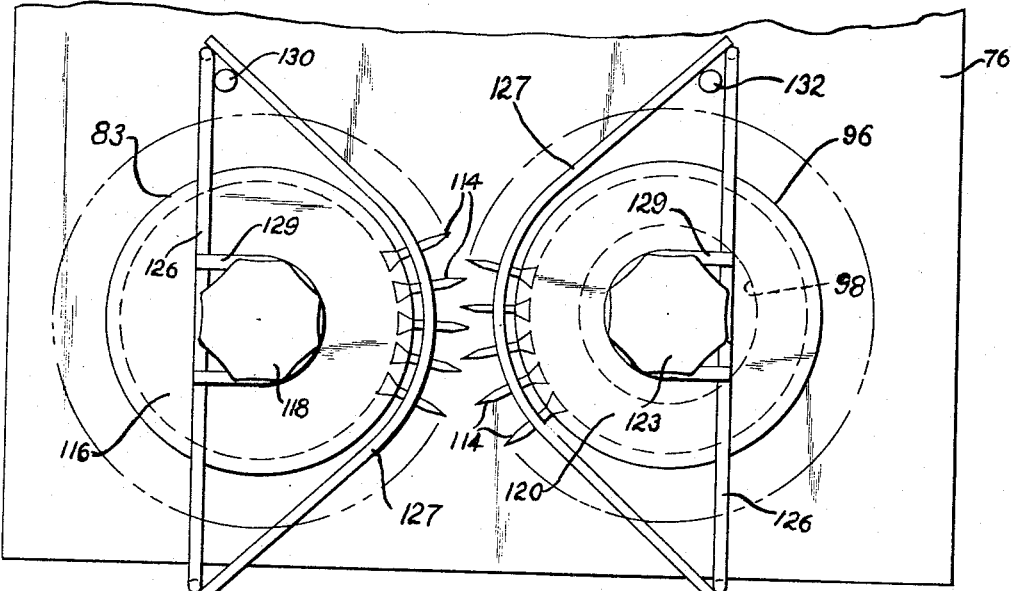

April 25, 1967 T. C. PAYNE 3,315,590
MEAT PROCESSING EQUIPMENT
Filed Aug. 6, 1965 4 Sheets-Sheet 4

INVENTOR
THOMAS C. PAYNE
BY
Horton, Davis, Brewer & Brugman
Attys.

United States Patent Office 3,315,590
Patented Apr. 25, 1967

3,315,590
MEAT PROCESSING EQUIPMENT
Thomas C. Payne, Rte. 1, Rockton, Ill. 61072
Filed Aug. 6, 1965, Ser. No. 477,685
15 Claims. (Cl. 99—254)

This invention relates to meat processing equipment, and more particularly to apparatus adapted to the piercing and impregnation of meat, such as that of poultry, with a flavoring or marinating material in a liquid form.

One of the objects of the invention is to provide apparatus suited to the piercing of bony pieces of poultry meat to provide a multiplicity of relatively small holes in the meat without piercing any bone, and then effectively to impregnate the pierced meat with liquid flavoring or marinating material.

As another object, this invention has within its purview the provision of apparatus of the type herein referred to and which embodies safety features for minimizing the possibility of injury to a user of the equipment.

This invention has for another object the provision of apparatus for the piercing and impregnation of meat, which apparatus affords ease of the complete cleaning of working parts, so that sanitary operating conditions are readily maintained.

Another object of the invention is to provide, in a unitary cabinet-type structure, the apparatus for piercing and impregnating pieces of meat.

It is another object of this invention to provide meat piercing apparatus in which pieces of meat pass between adjacent drums which each carry a multiplicity of flexible nonmetallic tines arranged in axially extending rows and which project radially from the outer drum surfaces, the tines of each row being integral with a supporting bar which is removably attachable to a drum.

As another object, this invention comprehends the provision of meat piercing apparatus wherein tines of plastic material are mounted on drums having substantially parallel axes of rotation, which drums are relatively movable toward and away from one another and biased toward one another to drive the tines into the meat as it passes therebetween, and said drums having stripper means associated therewith for effecting withdrawal of the tines from the meat after it is pierced.

This invention further has within its purview the provision of meat processing equipment embodying a vacuum chamber in which pieces of pierced meat are subjected to reduced pressure while being immersed in liquid flavoring or marinating material.

Other objects and advantages of my invention will be apparent from the following description and drawings of which:

FIG. 1 is a perspective view of meat processing equipment embodying a preferred form of this invention;

FIG. 2 is a front sectional view of the equipment shown in FIG. 1, wherein the section is taken substantially as indicated by a line 2—2 and accompanying arrows in FIG. 1;

FIG. 3 is an exploded view in perspective showing parts and the order of assembly of parts of a part of the equipment illustrated in FIG. 2;

FIG. 4 is a rear elevational view of a drive mechanism which functions in the operation of the portion of the equipment shown in FIG. 3;

FIG. 5 is a front elevational view depicting the assembly and assembled relationship of parts of the portion of the equipment shown in FIG. 3;

Figure 6:
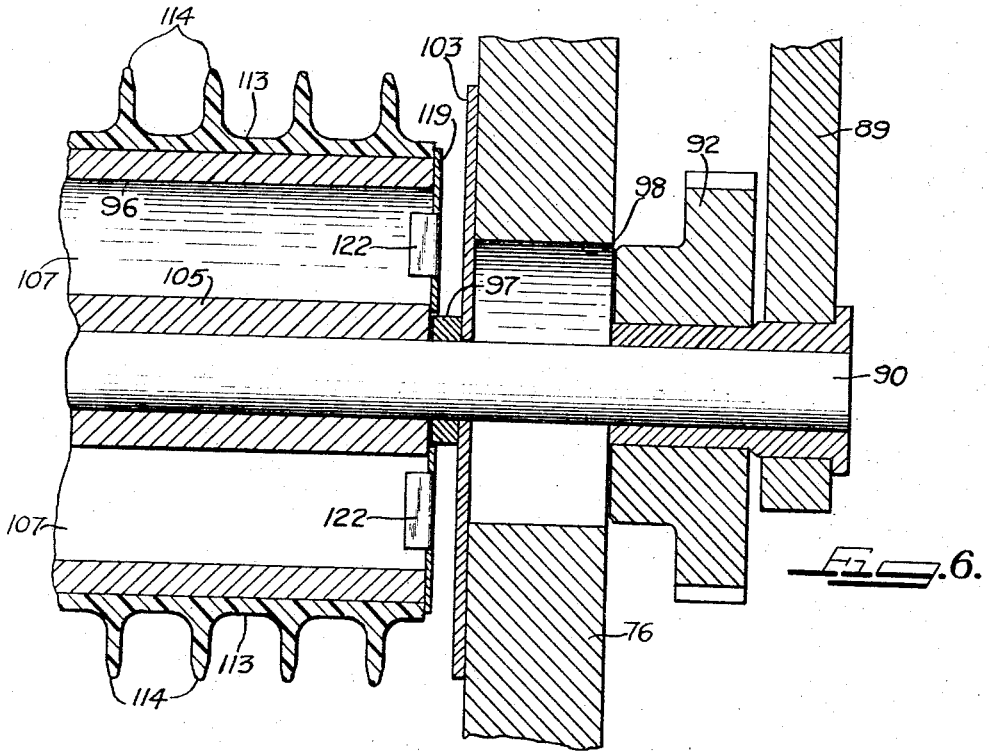
FIG. 6 is a fragmentary side sectional view taken substantially as indicated by a line 6—6 and accompanying arrows in FIG. 4.

Considered generally, and in particular reference to FIGS. 1 and 2 of the drawings, the exemplary embodiment of food processing equipment which is shown herein for illustrative purposes embodies a cabinet-type of outer enclosure 10 which is desirably made of a non-corrosive metal such as stainless steel. Briefly, the enclosure is divided into an upper compartment 12 and a lower compartment 13 on one side of a partition wall 14 and has another compartment 15 on the other side of the wall 14. The upper and lower compartments 12 and 13 are separated by a partition 16 having an opening 17 in the mid-region thereof. In the disclosed structure, a guide wall 18 extends through the opening 17 in the partition 16 into the compartments 12 and 13 and is secured to the partition 16.

Meat piercing apparatus 19 is housed in the compartment 12 and is disposed directly above the opening through the partition 16 and guide wall 18. A foraminous basket-type container 20 is removably disposed in the compartment 19 directly below the opening through the partition 16 and guide wall 18. At the top of the enclosure 10, a top wall plate 22 has an opening 23 therein which is directly above the meat piercing apparatus 19. A box-type guard 24 is disposed in the opening 23 and provides a passage 25 through which pieces of meat, such as cut portions of chicken, are passed by an operator, and from which the pieces of meat gravitate to the meat piercing apparatus. After passing through the meat piercing apparatus, wherein the meat is pierced with a multiplicity of holes, without damaging or piercing the bones in the meat, the pieces of meat fall through the opening in the partition 16 and guide wall 18 into the foraminous container 20.

The pieces of meat are pierced to provide multiplicity of holes therein, as aforementioned, to improve and speed the impregnation and treatment of the meat by a flavoring or marinating material in liquid form. Further to speed and improve the treatment and impregnation of the meat in the flavoring or marinating liquid, the operation of such treatment is accomplished with the aid of a vacuum chamber 26 which is housed within the compartment 15 of the outer enclosure.

In the equipment disclosed, a generally cylindrical metal container 27 having a bottom 28 and an open top 29 coacts with a dome-type movably supported metal cover 30. To define the vacuum chamber 26 as herein illustrated, an outwardly projecting flange 32 encompasses the open top of the metal container 27 and is secured to the top plate 22 of the outer enclosure, while the lower portion of the container 27 extends downwardly through an opening 33 in the top plate 22. A gasket 34 of inverted generally U-shaped section and made of a flexible and impervious material, such as rubber, serves as a hinge element between the cover 30 and the flange 32 on the metal container 27.

A container 35 made of either a suitable non-corrosive metal or of a suitable plastic fits into and is supported within the metal container 27 and contains a supply of the flavoring or marinating liquid which is sufficient to cover the pieces of meat being processed. The container 35 extends from the bottom of the container 27 to a position near the top thereof and has an overall internal size sufficient to freely receive the foraminous container 20 containing the pieces of meat which have been pierced. With the foraminous container 20 having pieces of pierced meat such as 36 contained therein and disposed in the container 35 with the pierced meat pieces below the level of the flavoring or marinating liquid, as indicated at 37 in FIG. 2, the cover 30 is closed, as shown in FIG. 1.

A vacuum pump 38, mounted in the lower portion of the compartment 15, is connected to the vacuum chamber 26 through a pipe 39 and is utilized to reduce the pressure within the vacuum chamber to a desired level, such as 20–24 inches of mercury, as indicated by a gauge 40 mounted on the top plate 22 and having communication to the interior of the vacuum chamber. This reduction of pressure withdraws air from the interior of the vacuum chamber and from the pierced pieces of meat, whereupon when the vacuum is relieved, the flavoring or marinating liquid is forced into the meat by atmospheric pressure. After this treatment, the container 20 may be removed from the container 35, allowing excess flavoring or marinating liquid to drain back in to the container 35. The pierced pieces of meat are then suitably flavored and may be dusted preparatory to cooking, but it is recommended that the chicken pieces should be refrigerated a few hours before dusting.

Considering the structures of the various parts of the equipment in greater detail, the outer enclosure 10 has base plates 42 and 43 which form the bottoms of the compartments 15 and 13 respectively. The base plates 42 and 43 are secured through means, such as angle-type frame and reinforcing members 44, 45, 46 and 47 to outer side walls 48 and 49 and to the intermediate partition wall 14. In addition, the base plates 42 and 43 are also secured to a back wall 50 which closes the rear of the cabinet-type enclosure. For convenience in moving the equipment, casters 52 are secured to the lower portion of the enclosure adjacent the corners thereof. The top plate 22 of the enclosure extends across the partition wall 14 and is secured to the side walls 48 and 49 as well as the back wall 50. At the front of the enclosure, the compartment 12 is normally closed by a removable panel 53. The upper portion of the compartment 15 is closed by a removable instrument panel 54 and an additional removable panel 55, while the lower portion of the chamber 15 is closed by a removable panel 56. In order to improve the utility and the service ability of the top plate 22, guard rails 57 and 58 are secured to the top plate 22 and project upwardly therefrom while extending along the back and one end of the top plate.

Figure 7:
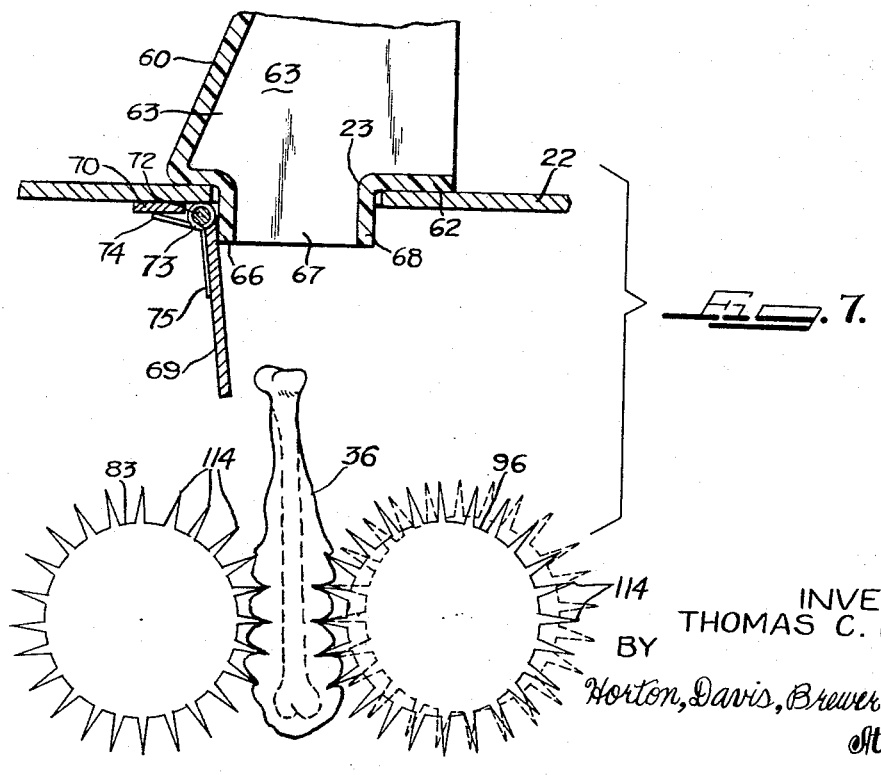
FIG. 7 is a fragmentary and somewhat diagramatic view of a portion of the equipment shown in FIG. 2 and depicts the action of the equipment as an illustrative piece of meat is being treated by the equipment.

The box-type guard 24, while readily removable from the enclosure by lifting it from the opening 23 in the top plate 22, is mounted as shown in FIGS. 1 and 2 during the use of the equipment to insure that an operator will be prevented from getting his fingers or any part of his hand into the meat piercing apparatus 19. This box-type guard is open at one side and has a top wall 59, a back wall 60 and a bottom wall 62, as well as end walls 63 and 64. The bottom wall 62 has an opening 65 set back from the open side thereof, which opening is large enough to freely pass cut pieces of meat which are to be pierced. The opening 65 is encompassed by flanges such as 66, 67 and 68 which extend downwardly from the guard and, when in place for use, as shown in FIGS. 2 and 7, extends through the opening 23 in the top plate 22. In addition to affording a mounting and locating element for the guard, the flange 66 serves to engage a hingedly mounted closure plate 69 on the interior of the top plate 22 to hold that enclosure plate in an out-of-the-way position during use of the equipment. The closure plate 69 is supported for swinging movement relative to a hinge plate 70 about a hinge pin 72. A torsion spring 73 has ends 74 and 75 which engage the hinge plate 70 and closure plate 69, normally to bias the closure plate 69 to a position in which it covers the opening 23 when the guard 24 is removed. Thus, the closure plate 69 serves to prevent dirt from getting into the equipment through the opening 23 when the equipment is not in use and acts to discourage use of the equipment when the guard 24 is not in its proper and operative position.

The meat piercing apparatus 19 is supported in the compartment 12 by a wall 76 which is disposed intermediate the back wall 50 of the enclosure and the removable front panel 53; the actual meat piercing parts being supported forwardly of that wall, as shown in FIGS. 2 and 5, while the driving mechanism for the wall, as shown in FIG. 4, is disposed rearwardly of the wall. As previously mentioned, the meat piercing parts shown in FIGS. 2 and 5 are directly below the opening 23 in the top plate 22 and also the passage 25 in the guard 24.

As shown in FIGS. 3 and 4, a shaft 77 is rotatably supported by the wall 76 and has a hub portion 78 thereon from which a portion 79 projects, which portion 79 has a flat surface 80 which fits into an axial opening 82 in a cylinder 83 to transmit driving force to the cylinder. As shown in FIG. 4, a gear 84 is secured to the rear end portion of the shaft 77, which gear meshes with a gear 85 which is drivingly secured on a motor driven shaft 86. Also meshed with the gear 85 is a similar gear 87 which is rotatably supported by a shaft 88, which shaft 88 also supports a hanger bar 89 for swinging movement relative to the axis of the shaft 88. The hanger bar 89 rotatably supports a shaft 90 which extends in substantially parallel relationship to the shaft 77. A gear 92 is secured to the rear end of the shaft 90 and meshes with the gear 87 to drive the gear 92 from the gear 85 and driven shaft 86, whereupon the shafts 77 and 90 are driven in opposite directions of rotation. The shaft 90 has a projecting portion 93 which has a flat surface 94 that engages in an axial opening 95 in a cylinder 96, whereby the cylinders 83 and 96 are supported for rotation about substantially parallel axes and are driven in opposite directions; the directions being such that pieces of meat dropped on to the upper surfaces of the cylinders move downwardly between the cylinders. The shaft 90 has a hub portion 97.

Since the hanger bar 89 is swingable relative to the axis of the shaft 88, and since the shaft 90 is rotatably supported by the hanger bar 89 in spaced relationship to the shaft 88, and also since the shaft 90 extends through an opening 98 in the wall 76, which opening is larger than the shaft 90, the shaft 90 and its cylinder 96 are supported for lateral movement relative to the shaft 77 and its cylinder 83. Thus, as shown in FIG. 4, the shaft 90 is movable in a direction lateral to its axis between the position shown in solid lines at 90 and a position shown in dot and dash lines at 90a. A spring 99 has one end secured to a pin 100 on the hanger bar 89 and has its other end anchored to a pin 102 secured to the wall 76. This spring biases the hanger bar 89 and its supported shaft 90 and also the cylinder 96 toward the axis of the shaft 77 which carries the cylinder 83. A plate 103 (FIGS. 3 and 6) covers the opening 98 in the wall 76.

The cylinders 83 and 96 respectively have central and axially extending hub portions 104 and 105 from which webs 106 and 107 extend radially to support an outer peripheral shell 108 and 109. The outer surfaces of the peripheral shells have axial grooves 110 and 112 therein, which grooves are of dovetail or wedge-like section and are equally spaced peripherally of the cylinder surface. The cylinders, in the disclosed structure, are made of metal, and the axial grooves or slots 110 and 112 slidably receive correspondingly shaped support bars 113 which have integrally formed thereon a row of projecting tines 114. When mounted on the cylinders and supported by their respective support bars, the tines 114 project in a substantially radial direction from the cylinder surfaces. In the disclosed structure, the support bars 113 and their integrally formed tines 114 are made of a molded plastic material, such as nylon, with the tines spaced relatively uniformly at distances which, for example, may be approximately ⅝″ apart. By having the tines made in this manner, and by not having them particularly sharp, but small enough to be relatively flexible, they have sufficient rigidity to pierce pieces of meat passed between the cylinders, as shown in FIG. 7, while being sufficiently flexible to be deflected by any bones encountered in the meat, whereupon the bones in the meat are not punctured in the meat piercing operation. It is important to perforate the meat for facilitating the impregnation of the meat with flavoring material, but very undesirable to pierce the bone within the meat, inasmuch as marrow cooks out from a pierced bone and causes the meat to have an unappetizing appearance if the bone is pierced.

In use, the cylinder 83 is mounted on the shaft 77 with circular plates 115 and 116 at its opposite ends. The plates 115 and 116 have integrally formed clips 117 thereon which straddle the webs 106 of the cylinder, and the assembled cylinder and its end plates are held in place on the shaft 77 by a thumb screw 118. Likewise, the cylinder 96 has end plates 119 and 120, which end plates have integral clips 122 and are held in assembled relationship on the shaft 90 by a thumb screw 123. The plates 115, 116, 119 and 120 on the two cylinders overlap the ends of the axial grooves or slots 110 and 112 to retain the support bars 113 in place relative to the cylinders during use. As depicted in FIG. 5, the normal disposition of the cylinders on their respective shafts is desirably such that the tines on the two cylinders are in staggered relationship relative to one another.

In order to effect the removal of tines from pierced pieces of meat, stripper elements 124 and 125 are provided. These stripper elements, for each cylinder, are of like structure, and each has a generally rectangular supporting frame part 126 which has secured thereto and carries a plurality of shaped bars 127 which, when mounted, are in spaced relationship axially of the respective cylinders and are spaced to intervene between the tines on the cylinder surfaces. As shown in FIG. 5, the bars 127 conform generally to the peripheries of the cylinders at their mid region, but diverge outwardly from the cylinders at their end regions and toward the frames 126, so that any piece of meat which is impaled on any tine will be stripped away from the cylinder and effectively removed as the cylinders rotate. For supporting the stripper elements 124 and 125 in operative positions relative to the cylinders, substantially U-shaped members are secured to the frames 126 and ride on the hub portions 78 and 97 of the shafts 77 and 90, as well as on circular portions 128 and 129 on the thumb screws 118 and 123 respectively. Rotation of the stripper elements is prevented by pins 130 and 132 (FIG. 5) which are secured to the plate 76.

From the foregoing description of the meat piercing parts of the disclosed equipment, it may be readily understood that those parts are readily disassembled for complete and thorough cleaning, and are easily assemblable for use. It is also noteworthy that the tines, even though somewhat blunt and flexible to avoid piercing bones in the meat, are readily replaceable in the event of either damage or wear. As viewed in FIG. 2, it may be seen that pieces of meat passed through the passage 25 in the guard 24 are guided by the stripper elements 124 and 125 to a position between the cylinders 83 and 96 being subjected to the piercing action of the tines 114. Since one cylinder is supported for lateral movement and is biased toward the other cylinder, the meat is effectively punctured by the tines without having the bones of the meat pierced. After being pierced, the meat is stripped from the tines by the action of the stripper elements 124 and 125 and falls into the container 20.

The cover 30 for the vacuum chamber is supported by a hinge 131 for swinging movement between a closed position as shown in FIG. 1 and an open position which is illustrated in FIG. 2. When closed, the cover of the vacuum chamber forms a seal with the gasket 34 so that the vacuum chamber may be evacuated.

As shown in FIG. 2, the vacuum pump 38 is mounted in the compartment 15 with the vacuum chamber 26. The vacuum pump is connected to the vacuum chamber through the pipe 39 and an intake filter 133. The pump is also provided with a siphon-type oiler 134 and exhaust muffler 135. In addition, a solenoid valve 136 is provided, which valve is electrically controlled from a knob 137 (FIG. 1) on the panel 54 of the enclosure, whereby action of the vacuum pump is controllable from the exterior of the equipment to start and stop the evacuation of the chamber 26, and to releave the reduced pressure in the chamber after it has been evacuated during the operation of impregnating pierced meat pieces. The operation of another electric motor (not shown) which is directly connected to the shaft 86 is controlled by a switch 138 on the control panel 54 to start and stop the operation of the meat piercing apparatus 19.

I claim:

1. Meat processing equipment comprising, in combination, a cabinet having a top and walls defining three compartments, two of which compartments are vertically aligned and the third of which is at one side of those that are vertically aligned, said vertically aligned compartments being separated by a wall having a relatively large opening in the mid-region thereof, said cabinet having a relatively small opening in the top at a position above the mid-region of said relatively large opening, meat piercing means including a pair of motor driven cylinders having radially projecting tines thereon mounted in the upper of said vertically aligned compartments between said openings for piercing holes in pieces of meat dropped thereon through said relatively small opening and from whence said pieces of meat drop through said relatively large opening, a foraminous container in the lower of said vertically aligned compartments for receiving pieces of meat dropped through said relatively large opening, a vacuum chamber in said third compartment of a size for receiving said foraminous container, and vacuum pump means for evacuating air from said vacuum chamber.

2. Meat processing equipment as defined in claim 1, and further characterized by said vacuum chamber having a vat therein for receiving said foraminous container and for holding a supply of liquid flavoring material.

3. Meat processing equipment as defined in claim 1, and further characterized by cover means for said relatively small opening in the top, said cover means having an opening therein encompassed by projecting flanges which fit into said relatively small opening in the top, and said cover means also having a side opening therein through which meat pieces are fed to and through the flanged opening.

4. Meat processing equipment as defined in claim 3, and further characterized by a cover plate hingedly mounted internally of said top for movements to and from a closed position in which it covers said relatively small opening, means biasing said cover plate to its closed position when said cover means is removed from the relatively small opening, and one of said projecting flanges on the cover means engaging said cover plate for holding the cover plate in an out-of-the-way position when the cover means is in place in the relatively small opening.

5. Meat processing equipment as defined in claim 1, and wherein said vacuum chamber is open upwardly through the top of said cabinet and has sealing gasket means thereon, and a cover for the vacuum chamber is hingedly mounted on the top of said cabinet for swinging movements to and from a closed position in sealing contact with said gasket means.

6. In meat processing equipment, meat piercing means for punching a multiplicity of relatively small holes in cut pieces of meat and comprising, in combination, a pair of cylinders mounted in adjacent side-by-side relationship, means supporting said cylinders for rotation about substantially parallel axes, means for driving said cylinders in opposite directions relative to said axes, said cylinders having tines mounted thereon in spaced axial rows and projecting radially outwardly therefrom, means supporting one of said cylinders for movements laterally of its axis toward and from the other, means normally biasing said one of the cylinders toward the other, and stripper means mounted between adjacent portions of the cylinders and having open spaces therein through which the tines project, said stripper means being relatively stationary and effecting withdrawal of the tines from pieces of meat as they pass between the driven cylinders.

7. In meat processing equipment as defined in claim 6, said tines being made of a non-metallic plastic material.

8. In meat processing equipment as defined in claim 6, said cylinders having slots of wedge-shaped section extending longitudinally thereof, and said tines being integrally formed on bars which fit slidably into said slots.

9. In meat processing equipment as defined in claim 6, said means for driving said cylinders in opposite directions including a pair of driving gears which mesh with driven gears on the cylinder axes and also mesh with one another, said pair of driving gears and said driven gears having axes spaced from one another, and said means supporting one of said cylinders for movements laterally of its axis comprising an arm suspended for swinging movements about the axis of one of said pair of driving gears, said arm serving as a support for the shaft of the driven gear with which said one of the pairs of driving gears is meshed.

10. In meat processing equipment, a guard element through which pieces of meat are inserted into the equipment to gravitate into functional engagement with power operated meat piercing apparatus, the combination comprising an enclosure including a top wall, power operated meat piercing apparatus mounted in said enclosure in spaced relationship to the top wall, said top wall having an opening therein directly above said meat piercing apparatus so that pieces of meat passed through said opening fall into operative engagement with said meat piercing apparatus, and a box-type guard for said opening, said box-type guard having top, end, back and bottom walls and an open front, said bottom wall having an opening therein spaced rearwardly from the front, and flanges encompassing said opening in the bottom wall and projecting downwardly therefrom, said flanges having external surfaces fitting into said opening in the top wall of the enclosure.

11. In meat processing equipment as defined in claim 10, the combination being further characterized by a cover plate for said opening in the top wall of the enclosure hingedly mounted on said top wall of the enclosure adjacent one edge of the said opening, means biasing the cover plate to a closed position covering said opening, and said flanges on the box-type guard being engageable with said cover plate to hold it in an open position when the guard is in place with the flanges in said opening.

12. In meat processing equipment, the combination comprising an enclosure having a top wall, said top wall having an opening therein, a metal container having an open top and an outwardly projecting top mounting flange encompassing the open top thereof, said container being mounted in said opening in the top wall of the enclosure with said mounting flange overlying the margin of said opening, gasket means mounted on said flange and encompassing the open top of said container, a cover for said container having a surface for engagement with said gasket means to form a seal, a hinge secured to said cover and connected to said top wall of the enclosure for swinging movements between an open position in which said cover is removed from the container and a closed position in which the cover forms a seal with said gasket means, and means for evacuating the container when the cover is in said closed position.

13. In meat processing equipment as defined in claim 12, and wherein said hinge has stop means thereon for engaging said top wall of the enclosure to hold said cover upright when in said open position.

14. In meat processing equipment as defined in claim 12, the combination being further characterized by a liquid container having an open top and fitted into said metal container, and a foraminous container fitting loosely into said liquid container.

15. In meat processing equipment, meat piercing means including a cylinder having spaced tines projecting therefrom in generally radial directions, said cylinder having grooves extending longitudinally of the surface thereof, said tines being integrally formed in spaced and projecting relationship along a bar-type base which fits slidably into said grooves in the cylinder, a wire cage structure encompassing a portion of the periphery of said cylinder, said cage structure including a frame having a plurality of wire guards secured thereto at opposite ends and curved at their mid-regions to conform generally to the curvature of the periphery of said cylinder and end regions which diverge away from the cylinder, and said wire guards being disposed in generally parallel planes and defining spaces therebetween through which said tines project at the curved mid-regions of the wire guards.

References Cited by the Examiner

UNITED STATES PATENTS

| | | | |
|---|---|---|---|
| 328,016 | 10/1885 | Dickinson | 99—255 |
| 474,446 | 5/1892 | Fey | 99—255 |
| 1,597,855 | 8/1926 | Zahorsky | 15—402 |
| 2,670,490 | 3/1954 | Gartrell | 15—200 |
| 2,742,367 | 4/1956 | Bachert | 99—255 |

FOREIGN PATENTS

| | | |
|---|---|---|
| 58,311 | 6/1953 | France. |

WALTER A. SCHEEL, *Primary Examiner.*

R. W. JENKINS, *Assistant Examiner.*